United States Patent
Marking et al.

(10) Patent No.: US 7,535,176 B2
(45) Date of Patent: May 19, 2009

(54) VUV-EXCITED DEVICE WITH BLUE-EMITTING PHOSPHOR

(75) Inventors: Gregory A. Marking, Sayre, PA (US); Chung-Nin Chau, Athens, PA (US); Thomas M. Snyder, Laceyville, PA (US); Shellie K. Northrop, Sayre, PA (US); Chen Wen Fan, Sayre, PA (US)

(73) Assignee: Osram Sylvania Inc., Danvers, MA (US)

( * ) Notice: Subject to any disclaimer, the term of this patent is extended or adjusted under 35 U.S.C. 154(b) by 276 days.

(21) Appl. No.: 10/555,275

(22) PCT Filed: May 13, 2004

(86) PCT No.: PCT/US2004/015079

§ 371 (c)(1), (2), (4) Date: Oct. 10, 2006

(87) PCT Pub. No.: WO2004/105070

PCT Pub. Date: Dec. 2, 2004

(65) Prior Publication Data

US 2007/0069623 A1 Mar. 29, 2007

Related U.S. Application Data

(60) Provisional application No. 60/470,635, filed on May 15, 2003, provisional application No. 60/470,734, filed on May 15, 2003.

(51) Int. Cl.
*H01J 1/62* (2006.01)

(52) U.S. Cl. .................. 313/584; 313/486; 313/487; 313/577

(58) Field of Classification Search .............. None
See application file for complete search history.

(56) References Cited

U.S. PATENT DOCUMENTS

| | | | |
|---|---|---|---|
| 3,670,194 A | 6/1972 | Thornton et al. | |
| 4,733,126 A | 3/1988 | Yamakawa et al. | |
| 4,827,187 A * | 5/1989 | Verlijsdonk | 313/486 |
| 5,471,113 A | 11/1995 | De Backer et al. | |
| 6,621,211 B1 * | 9/2003 | Srivastava et al. | 313/503 |
| 6,777,879 B2 * | 8/2004 | Juestel et al. | 315/59 |
| 7,282,849 B2 * | 10/2007 | Ohto et al. | 313/486 |
| 2002/0025901 A1 | 2/2002 | Ono et al. | |
| 2002/0190240 A1 | 12/2002 | Feldmann et al. | |
| 2003/0122108 A1 * | 7/2003 | Ravilisetty | 252/301.4 R |
| 2004/0212292 A1 | 10/2004 | Oto et al. | |

FOREIGN PATENT DOCUMENTS

| | | |
|---|---|---|
| CN | 1027282 C | 1/1995 |
| EP | 1 030 339 A1 | 8/2000 |
| WO | WO 03/016431 A1 | 2/2003 |

* cited by examiner

*Primary Examiner*—Ashok Patel
(74) *Attorney, Agent, or Firm*—Robert F. Clark

(57) ABSTRACT

Blue-emitting phosphors for use with plasma display panels (PDP) or other vacuum ultraviolet-excited (VUV) devices are provided. These blue-emitting phosphors and mixtures thereof include at least a europium-activated calcium-substituted barium hexa-aluminate (CBAL) phosphor. Preferably, the CBAL phosphor has a composition which may be represented by the formula: $Ba_{1.29-x-y}Ca_xEu_yAl_{12}O_{19.29}$, wherein $0<x<0.25$ and $0.01<y<0.20$. These blue-emitting phosphors exhibit improved degradation characteristics, including reduced color shift and increased intensity maintenance, under conditions found in VUV-excited devices.

15 Claims, 1 Drawing Sheet

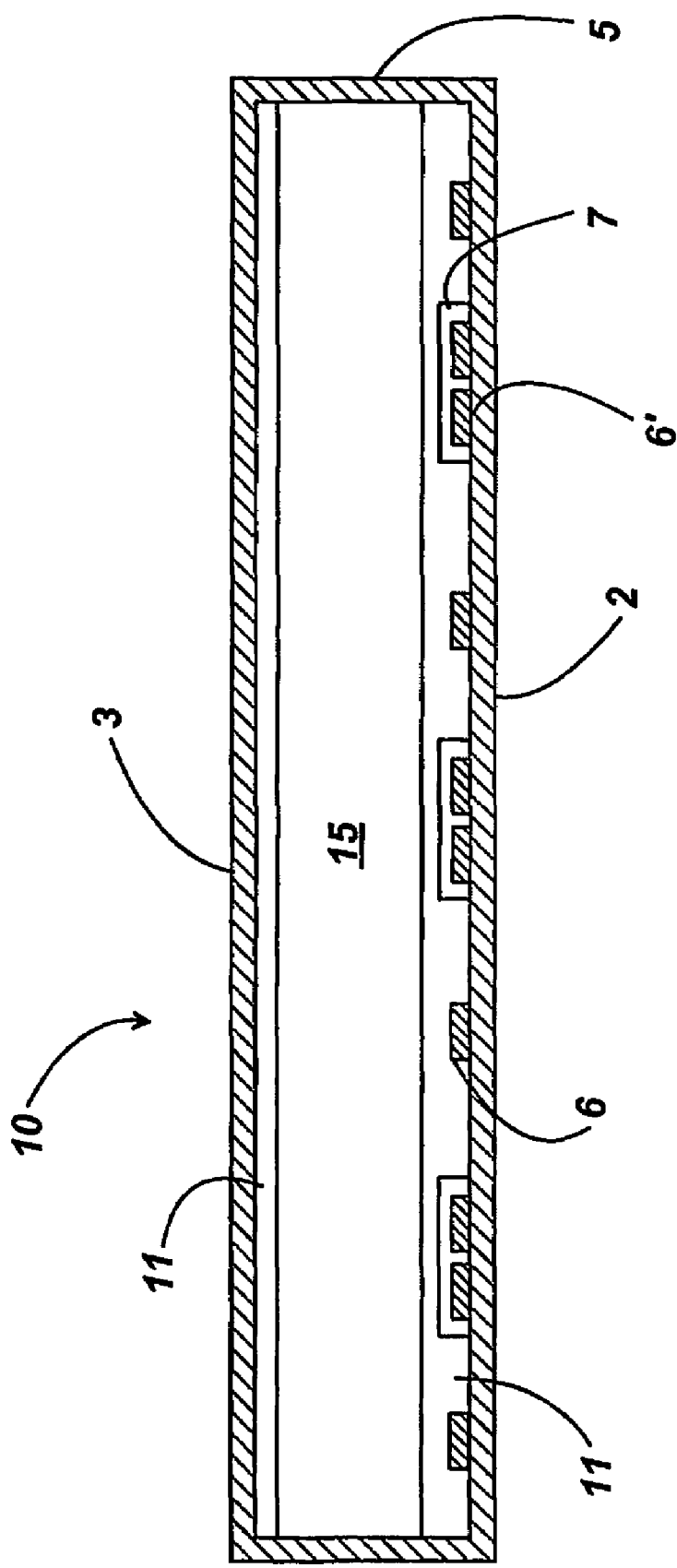

VUV-EXCITED DEVICE WITH BLUE-EMITTING PHOSPHOR

CROSS REFERENCES TO RELATED APPLICATIONS

This application claims the benefit of U.S. Provisional Application Nos. 60/470,734 and 60/470,635, both filed May 15, 2003.

TECHNICAL FIELD

This invention relates to blue-emitting phosphors and mixtures thereof for use in plasma display devices or other vacuum ultraviolet (VUV) excited devices. These devices include, in part, such apparatus as a plasma display panel or vacuum ultraviolet excited lamp which consist in part of a sealed transparent structure filled with a rare gas or a mixture of such rare gases and also containing red-, green-, or blue-emitting phosphors. A high voltage electrical current produces a gas discharge which emits vacuum ultraviolet radiation as a primary source of excitation. The VUV radiation then excites the phosphors to emit visible light.

BACKGROUND OF THE INVENTION

Conventional plasma display devices are filled with rare gases (e.g., helium, neon, argon, xenon, and krypton) or mixtures of rare gases, which are excited by a high voltage electrical current to emit ultraviolet radiation in the VUV range below 200 nm in wavelength. This emitted VUV radiation is then used a primary source of excitation to excite various blue, green, and red emitting phosphors. The plasma display panels (PDP) are made with a back carrier plate, a transparent front plate, and a ribbed structure, which divides the space between the front and back plates into cells. The plasma display panels also contain a sophisticated electrode array, which can address and excite each discrete plasma cell individually. Each cell contains a small amount of the rare gas mixture and a small quantity of phosphor, which emits only one of the three colors. Cells containing phosphors which emit with each of the three distinct colors, red, green, and blue, are statistically distributed on the back plate within the panel in much the same fashion as the different colored pixels are distributed in other types of display panels, such as CRT displays. Like plasma display panels, VUV-excited lamps also contain rare gases or mixtures of rare gases and similar phosphors. The excitation-emission principles are similar to display panels except that blends of blue, green, and red phosphors are broadly coated on the inside of a lamp and emit with an intent to generate an overall white color instead of the three separate colors which are emitted by the various discrete plasma cells.

The most commonly used VUV excitation energy comes from xenon or xenon-helium plasmas, which emit in the region 147 nm to 173 nm. The exact emission spectra depends on the Xe concentration and overall gas composition. Under high voltage excitation, Xe-based plasmas typically have a Xe emission line at 147 nm and a Xe excimer band emission around 173 nm. This is very different from the primary 254 nm excitation radiation produced by the low-pressure, mercury vapor discharge of conventional fluorescent lamps. As a result, phosphors used in VUV-excited applications have new requirements imposed on them by the higher excitation energies as compared to conventional short-wave ultraviolet fluorescent applications.

In general, the phosphors used in VUV-excited devices exhibit some undesirable properties. However, the most problematic is the phosphor commonly used as the blue emitter, europium-activated barium magnesium aluminate (BAM), $Ba_{1-x}Eu_xMgAl_{10}O_{17}$ (0.01<x<0.20). This phosphor is known to degrade in both brightness and color during the manufacturing process due to elevated temperatures and humidity. During manufacture of PDP panels, a thin MgO layer is applied for the purpose of protecting the transparent front plate and dielectric layer. MgO is quite hygroscopic and the high humidity conditions found during manufacture of the panels arise from water that is dissociated from the MgO layer during bakeout. This water is believed to be instrumental in the degradation in color causing a shift in the color point towards the green region. This phosphor also degrades in both brightness and color after extended exposure to the high intensity Xe plasma and VUV photon flux. The degradation mechanisms of BAM are the subject of much study and are thought to involve such changes as oxidation of $Eu^{2+}$ to $Eu^{3+}$, modifications in the actual structure of the aluminate phosphor lattice, and movement of the $Eu^{2+}$ activator ions between different sites within the lattice. The actual life of a commercial plasma display panel is dramatically shortened due to the shift in the color point and reduction in intensity of the blue phosphor component, which leads to an undesirable yellow shift in the overall panel color. One highly relevant measure of this degradation is the ratio of the intensity (I) to the CIE y color point which can be calculated as a percentage. Both the intensity decrease and the increase in CIE y color coordinate (green shift) result in a reduction of the I/y ratio.

In recent years, a number of different approaches have been attempted in order to improve the maintenance of blue-emitting VUV-excited BAM phosphors. These approaches include sol-gel coating of wide bandgap metal oxides onto BAM phosphor, U.S. Patent Publication No. 2002/0039665; thermal treatments of aluminate phosphors mixed with ammonium fluorides, U.S. Pat. No. 6,242,043; and solution based catena-polyphosphate coatings of BAM phosphor, U.S. Pat. No. 5,998,047. Substitutional variations of the BAM stoichiometry have also been attempted in order to improve the maintenance of BAM such as substitution of alkali metals, alkaline earth metals, or zinc for one or more of the metallic components in BAM, U.S. Patent Publication No. 2002/0190240 A1. To date, none of these approaches have been entirely successful.

In addition, new phosphor compositions have been investigated which exhibit improved maintenance relative to commercial BAM phosphors such as $(La_{1-x-y-z}Tm_xLi_ySr_z)PO_4$, U.S. Pat. No. 5,989,454; $Ba_{1-a}Eu_aMgAl_6O_{11}$, U.S. Pat. No. 6,527,978; $CaMgSi_2O_6$:$Eu^{2+}$; and $CaAl_2O_4$:$Eu^{2+}$. A solid solution phase of BAM-barium hexa-aluminate ($0.82BaO.6Al_2O_3$) exhibits improved color stability and maintenance but has an undesirable color point. New mixtures or blends of blue VUV phosphors have also been disclosed with improved maintenance characteristics such as $(La_{1-x-y-z}Tm_xLi_yAE_z)PO_4$ mixed with BAM, $Eu^{2+}$-activated barium magnesium lanthanum aluminate, $Eu^{2+}$-activated alkaline earth chloroapatite, or $Eu^{2+}$-activated calcium chloroborate phosphors, U.S. Pat. No. 6,187,225; and BAM or SCAP $(Ba,Sr,Ca)_5(PO_4)_3Cl$:Eu mixed with a wide number of UV-C light emitting phosphors, U.S. Patent Publication No. 2001/0033133 A1.

Although many of these phosphors or phosphor complexes exhibit improvements in color and intensity stability, none have yet proven to be viable alternatives. Thus, there is still a need for improved blue-emitting VUV-excited phosphors. In particular, the following properties would be desirable: a deeper blue color, improved color stability during panel manufacture, improved lifetime during panel operation, and a high relative percent maintenance of the I/y ratio after accelerated thermal, humidity, Xe plasma, and high intensity VUV photon flux testing.

SUMMARY OF THE INVENTION

It has been discovered that an europium-activated, calcium-substituted barium hexa-aluminate (CBAL) phosphor can be used in VUV-excited devices as an acceptable blue-emitting phosphor without suffering the degradation exhibited by BAM phosphors. CBAL phosphors have been previously described as a conventional fluorescent phosphor in U.S. Pat. No. 4,827,187, for use with mercury vapor discharges, but have not heretofore been described for use in VUV-excited devices. Preferably, the CBAL phosphor has a composition represented by the formula $Ba_{1.29-x-y}Ca_xEu_yAl_{12}O_{19.29}$, wherein $0<x<0.25$ and $0.01<y<0.20$.

Under VUV excitation, CBAL phosphors exhibit a deeper blue emission peak than BAM phosphors, but with only 80-85% the initial intensity of a commercially available BAM phosphor. However, upon exposure to elevated temperature and humidity conditions, CBAL phosphors exhibit very nearly zero green shift in the color point and very little loss of intensity. Furthermore, upon exposure to a high intensity VUV photon flux used as an accelerated aging test, the CBAL phosphor exhibits less than ½ the intensity degradation found in a commercial BAM phosphor and very nearly no color shift. CBAL phosphors may be also coated with an aluminum oxyhydroxide coating resulting in additional improvements to its maintenance when exposed to the high intensity VUV photon flux. These coated phosphors will be hereinafter referred to by the acronym cCBAL. The CBAL phosphors may also be used in combination with other blue-emitting phosphors. In particular, CBAL and cCBAL phosphors may be blended with a BAM phosphor, a BAM phosphor having an aluminum oxyhydroxide coating (cBAM), or thulium- and lithium-activated gadolinium lanthanum phosphate (LaPOT), $(Gd,La)PO_4:Tm,Li$, a near-UV-, blue-, and IR-emitting phosphor which is described in U.S. Pat. Nos. 6,187,225, 5,989,454, and 6,419,852.

BRIEF DESCRIPTION OF THE DRAWING

The FIGURE is a cross-sectional illustration of a VUV-excited device.

DETAILED DESCRIPTION OF THE INVENTION

For a better understanding of the present invention, together with other and further objects, advantages and capabilities thereof, reference is made to the following disclosure and appended claims taken in conjunction with the above-described drawing.

The FIGURE illustrates a type of VUV-excited device which is generally referred to as a dielectric barrier discharge lamp. The flat rectangular-shaped device is shown in cross section. The discharge vessel 10 is constructed of a transparent material such as glass and comprises a front plate 3 and a back plate 2 which are joined by frame 5 at the periphery of the plates. The discharge vessel 10 encloses discharge chamber 15 which contains a rare gas, typically xenon, or mixture of rare gases, and is used to generate a discharge which emits vacuum ultraviolet (VUV) radiation. The back plate 2 has multiple strip electrodes 6 which may serve as anodes and cathodes during operation. At least some of the electrodes 6' are covered with a dielectric barrier layer 7. The inner surface of the top plate 3 and back plate 2 are coated with a phosphor layer 11 for converting at least some of the VUV radiation into visible light. Further examples of dielectric barrier discharge lamps are described in U.S. Pat. Nos. 6,566,810, 6,246,171 and 6,469,435. Examples of plasma display panels are described in U.S. Pat. Nos. 6,713,959 and 6,726,519.

Laboratory tests have been designed to simulate actual PDP panel manufacturing and use, including a thermal humidity test and an accelerated aging test. Brightness before and after the thermal humidity and accelerated aging tests were obtained by measuring emission spectra using a Perkin-Elmer LS-50B spectrometer and quantifying them relative to the emission spectrum of a standard BAM phosphor reference. The peak wavelengths at maximum intensity were derived from the spectra and the y coordinate color values were calculated from the spectral data using well-known and accepted equations based on X, Y, Z-tristimulus curves. The excitation source is a commercially available xenon excimer lamp (XeCM-L from Resonance, Ltd., Barrie, Ontario, Canada) used to illuminate powder plaques while excluding air from the VUV beam path. The phosphor can also be mixed into a paste, coated onto alumina chips or "slides" and dried, and measured in this fashion.

The thermal humidity test involves exposing the phosphor samples to a warm, water-saturated air flow at 425° C. for 2 hours. The accelerated aging test involves exposure to a high intensity Xe plasma and VUV photon flux. The accelerated aging test is performed in a high-power, rare-gas discharge chamber. The chamber consists of a 100 cm loop of 5 cm I.D. Pyrex™ tubing that has approximately 5 millitorr of flowing Xe after it is initially evacuated to a $10^{-6}$ torr vacuum. An inductively coupled discharge is obtained by applying approximately 280 watts of input power at 450 kHz from an RF power supply. It is estimated that there is approximately 90 milliwatts/cm$^2$ of 147 nm VUV radiation at the sample surface. No significant excimer emission is generated under these conditions. After a selected amount of exposure time, the phosphor samples were measured for brightness as described above. Limited results for PDP panels indicate that such accelerated tests do indeed simulate actual PDP panel manufacturing and usage conditions. The results of these tests may also be used to predict phosphor performance in other types of VUV-excited devices such as dielectric barrier discharge lamps.

EXAMPLES

CBAL phosphors can be made by thoroughly blending aluminum hydroxide, barium carbonate, calcium carbonate, europium oxide, and barium fluoride or boric acid and then firing the resulting mixture in alumina or alumina-based trays for between 2 and 4 hours at 1400° C. to 1600° C. in a reducing furnace under a nitrogen-hydrogen atmosphere (ranging from 5% hydrogen to 75% hydrogen with the remainder being nitrogen gas). The fired cakes are then washed in de-ionized water and wet sieved through a 378 mesh screen or alternatively lightly milled before wet sieving. The material is then dried and dry screened through a 60 mesh sieve to break up any possible agglomerates. Three non-limiting examples of CBAL formulations are listed below. Formulation #1 was used to prepare the samples for accelerated testing. Formulation variations can be used to prepare similar phosphors with similar properties.

CBAL Formulation #1

| Reagent | molar ratio | wt. Ratio (adjusted by assay) |
|---|---|---|
| $Al(OH)_3$ | 11.0000 | 6.9076 |
| $CaCO_3$ | 0.1700 | 0.1366 |
| $BaF_2$ | 0.1000 | 0.1407 |
| $Eu_2O_3$ | 0.0400 | 0.1153 |
| $BaCO_3$ | 0.8325 | 1.3251 |

CBAL Formulation #2

| Reagent | molar ratio | wt. Ratio (adjusted by assay) |
|---|---|---|
| $Al(OH)_3$ | 11.0000 | 3.3458 |
| $CaCO_3$ | 0.1500 | 0.0602 |
| $BaF_2$ | 0.1000 | 0.0704 |
| $Eu_2O_3$ | 0.0400 | 0.0576 |
| $BaCO_3$ | 0.8525 | 0.6785 |

CBAL Formulation #3

| Reagent | molar ratio | wt. Ratio (adjusted by assay) |
|---|---|---|
| $Al(OH)_3$ | 11.0000 | 3.443 |
| $CaCO_3$ | 0.1000 | 0.040 |
| $H_3BO_3$ | 0.20 wt % | 0.009 |
| $Eu_2O_3$ | 0.0400 | 0.056 |
| $BaCO_3$ | 1.003 | 0.794 |

The procedure for applying an aluminum oxyhydroxide coating in order to form the cCBAL and cBAM phosphors involves suspending the powders in a fluidized bed reactor in which vaporized trimethylaluminum (TMA) and water vapor are reacted at about 430° C. to form an aluminum oxyhydroxide coating. A nitrogen gas stream is introduced into the base of the reactor through a metal frit distributor plate in order to fluidize the bed of phosphor particles. The reactor is then heated to about 430° C. by an external furnace. Vaporized TMA from a heated TMA bubbler (34° C.) and water vapor from a heated water bubbler (70° C.) are entrained in separate nitrogen gas streams. The TMA/nitrogen stream is combined with the nitrogen fluidizing gas and passed into the reactor through the distributor plate. After saturating the phosphor particles with TMA vapor for about one minute, the water vapor/nitrogen stream is introduced into the reactor through a central distributor. The central distributor is preferably a perforated hollow shaft which has been inserted into the reactor through the top and may be part of a vibrating mixer used to keep the particles fluidized. The TMA and water react to form an aluminum oxyhydroxide coating on the phosphor particles. The thickness of the coating on the individual particles may be adjusted by manipulating the time spent in the reactor, the concentrations of the reactants in the gas streams, and the flow rates of the reactant gas streams.

Blends of CBAL-BAM and cCBAL-BAM phosphors were prepared by adding amounts of the two components to a clean glass container and then thoroughly mixing them by a roll-blending technique. Such mixtures can easily be modified to give the desired properties by adjusting the weight ratios of the two components.

Blends of CBAL-LaPOT and cCBAL-LaPOT were prepared by adding specified quantities of the two components to glass containers along with a small amount of media and de-ionized water and thoroughly mixing the material by roll-blending for 20 minutes. The media were removed and the samples were dried before testing. As stated before, such mixtures can easily be modified to give the desired properties by adjusting the weight ratios of the two components. Preferably, the ratios of the CBAL:LaPOT components will range from 2:1 to 20:1 by weight.

Test Results

Samples of CBAL, cCBAL, cBAM, CBAL-BAM mixtures, CBAL-cBAM mixtures, CBAL-LaPOT mixtures, and cCBAL-LaPOT mixtures were measured along with a sample of commercially available BAM phosphor (used as the control) for initial intensity relative to a standard. The VUV emission spectra were collected using the Perkin-Elmer LS-50B spectrometer previously described. The samples were then degraded through the thermal-humidity treatment previously described and the VUV intensities were re-measured. All samples were degraded under experimentally equivalent conditions. The same samples were further degraded through exposure to a high intensity Xe plasma and VUV photon flux using the apparatus previously described and their VUV intensities re-measured.

Table 1 provides the results of the powder plaque optical emission measurements for the initial and degraded VUV-excited phosphors. The term "TH" refers to samples degraded by exposure to elevated temperature and humidity. The term "THX" denotes samples which have been further degraded after the TH testing by exposure to the high intensity Xe plasma and VUV photon flux. Intensity is measured relative to a standard BAM phosphor. The blend ratios in parentheses are given in terms of phosphor weight.

TABLE 1

Powder Plaque Data

| | BAM control | CBAL | cBAM | CBAL-BAM (1:1) | CBAL-cBAM (1:1) | CBAL-LaPOT (5:1) | CBAL-LaPOT (11:1) |
|---|---|---|---|---|---|---|---|
| Intensity (initial) | 96% | 80% | 82% | 87% | 81% | 75% | 77% |
| Peak λ (initial) | 447 nm | 440 nm | 448 nm | 444 nm | 444 nm | 440 nm | 440 nm |
| y value (initial) | 0.0466 | 0.0552 | 0.0476 | 0.0505 | 0.0508 | 0.0588 | 0.0582 |
| Intensity (TH) | 88% | 76% | 79% | 81% | 76% | 72% | 74% |

TABLE 1-continued

Powder Plaque Data

|  | BAM control | CBAL | cBAM | CBAL-BAM (1:1) | CBAL-cBAM (1:1) | CBAL-LaPOT (5:1) | CBAL-LaPOT (11:1) |
|---|---|---|---|---|---|---|---|
| Peak λ (TH) | 458 nm | 440 nm | 456 nm | 449 nm | 448 nm | 440 nm | 440 nm |
| (TH) y value | 0.0852 | 0.0564 | 0.0806 | 0.0719 | 0.0701 | 0.0581 | 0.0575 |
| % (I/y) (TH) | 50% | 93% | 57% | 65% | 68% | 96% | 98% |
| Intensity (THX) | 52% | 48% | 57% | 49% | 49% | 46% | 48% |
| Peak λ (THX) | 456 nm | 440 nm | 455 nm | 447 nm | 448 nm | 440 nm | 440 nm |
| y value (THX) | 0.0931 | 0.0632 | 0.0912 | 0.0759 | 0.0785 | 0.0675 | 0.0668 |
| % (I/y) (THX) | 27% | 53% | 36% | 37% | 40% | 54% | 55% |

Although the BAM control sample exhibits the greatest initial intensity, it also exhibits the worst degradation as measured by the % (I/y) ratio. The I/y ratio after thermal-humidity testing is only 50% of the initial I/y ratio for the BAM control and 27% of the initial I/y ratio after thermal-humidity and high intensity Xe plasma—VUV photon flux testing. Its final intensity (THX) is at most 6% higher than the least intense sample while initially the BAM control was as much as 16% higher than the least intense sample.

All of the experimental samples exhibit significantly better maintenance of the I/y ratio than does the BAM control. In particular, the CBAL and CBAL-LaPOT mixtures exhibit superior maintenance of the I/y ratio after degradation testing. The TH samples are more than 80% better than BAM, maintaining at least 93% of the initial I/y ratio after thermal humidity testing (vs. 50% for the control) and the THX samples are nearly 100% better than BAM, maintaining at least 53% of the initial I/y ratio after thermal-humidity and high intensity Xe plasma—VUV photon flux testing (vs. 27% for the control). In addition, all CBAL-containing samples have a bluer peak wavelength both before and after TH and THX treatments compared to the BAM control. The CBAL-BAM and CBAL-cBAM mixtures show improved degradation maintenance over BAM and cBAM alone, respectively.

Table 2 provides the results of powder plaque and paste slide optical emission results from initial and degraded VUV-excited phosphors. As in Table 1, intensity is measured relative to a standard BAM phosphor and the blend ratios in parentheses are given in terms of phosphor weight. The term "X" denotes samples which have been degraded only by exposure to the high intensity Xe plasma and VUV photon flux. In an effort to obtain data which more closely approximated PDP panel manufacturing, paste slide data was obtained by mixing the phosphor samples with a paste designed for PDP panels, e.g., the paste described in U.S. Pat. No. 6,660,184.

TABLE 2

|  | Powder Plaque Data | | | Paste Slide Data | | | | |
|---|---|---|---|---|---|---|---|---|
|  | BAM (control) | CBAL | cCBAL | BAM (control) | CBAL | cCBAL | CBAL-LaPOT (9:1) | cCBAL-LaPOT (9:1) |
| Intensity (initial) | 96% | 76% | 68% | 104% | 84% | 79% | 84% | 77% |
| Peak λ (initial) | 446 nm | 439 nm | 439 nm | 446 nm | 439 nm | 439 nm | 439 nm | 439 nm |
| Initial y value | 0.0465 | 0.0568 | 0.0553 | 0.0466 | 0.0518 | 0.0517 | 0.0518 | 0.0523 |
| Intensity (TH) | 87% | 74% | 69% | 96% | 82% | 79% | 79% | 77% |
| Peak λ (TH) | 456 nm | 439 nm | 439 nm | 456 nm | 439 nm | 439 nm | 439 nm | 439 nm |
| (TH) y value | 0.0803 | 0.0571 | 0.0566 | 0.0771 | 0.0527 | 0.0542 | 0.0535 | 0.0546 |
| % (I/y) (TH) | 52% | 96% | 98% | 56% | 96% | 95% | 91% | 96% |
| Intensity (X) | 57% | 42% | 49% | 76% | 61% | 66% | 67% | 69% |
| Peak λ (X) | 446 nm | 439 nm | 439 nm | 446 nm | 439 nm | 439 nm | 439 nm | 439 nm |
| (X) y value | 0.0527 | 0.0625 | 0.0608 | 0.0504 | 0.0565 | 0.0563 | 0.0573 | 0.0568 |
| % (I/y) (X) | 53% | 50% | 65% | 68% | 66% | 76% | 72% | 82% |

TABLE 2-continued

|  | Powder Plaque Data | | | Paste Slide Data | | | | |
| --- | --- | --- | --- | --- | --- | --- | --- | --- |
|  | BAM (control) | CBAL | cCBAL | BAM (control) | CBAL | cCBAL | CBAL-LaPOT (9:1) | cCBAL-LaPOT (9:1) |
| Intensity (THX) | 52% | 47% | 49% | 64% | 60% | 65% | 63% | 63% |
| Peak λ (THX) | 454 nm | 439 nm | 439 nm | 454 nm | 439 nm | 439 nm | 439 nm | 439 nm |
| (THX) y value | 0.0901 | 0.0642 | 0.0633 | 0.0905 | 0.0596 | 0.0602 | 0.0602 | 0.0606 |
| % (I/y) (THX) | 28% | 54% | 63% | 32% | 62% | 70% | 65% | 70% |

The degradation results from powder and paste preparations of the same samples are basically equivalent. Although the paste brightness results tend to be higher than the powder brightness values, they are relatively the same. The peak wavelength at maximum intensity does not change for either the CBAL or cCBAL samples while the BAM control sample shows a large shift in color after the thermal humidity test. The initial brightness for the BAM control is much higher than the initial brightness of the CBAL, cCBAL, CBAL-LaPOT, and cCBAL-LaPOT samples, while after exposure to the thermal humidity test and the high intensity Xe plasma and VUV photon flux, all samples have comparable brightness. The maintenance of in terms of % (I/y) for the CBAL sample after (THX) thermal humidity and Xe plasma testing is vastly superior to that of the BAM control (54% vs. 28% and 62% vs 32%, respectively) and the maintenance of the aluminum oxyhydroxide-coated CBAL (cCBAL) is further superior to that of uncoated CBAL. The cCBAL material also exhibits significantly improved maintenance after high intensity Xe plasma and VUV photon flux exposure without any thermal humidity tests being involved. The CBAL-LaPOT and cCBAL-LaPOT blends behave similarly to the CBAL and cCBAL components, but show higher maintenance values.

While there has been shown and described what are at the present considered the preferred embodiments of the invention, it will be obvious to those skilled in the art that various changes and modifications may be made therein without departing from the scope of the invention as defined by the appended claims.

We claim:

1. A VUV-excited device including a discharge chamber with a phosphor coating, the discharge chamber containing a rare gas or rare gas mixture, the phosphor coating being applied to an inner surface of the discharge chamber, the device when operated generating a discharge which emits vacuum ultraviolet radiation as a primary source of excitation, the phosphor coating containing a europium-activated, calcium-substituted barium hexa-aluminate phosphor having a composition which is represented by $Ba_{1.29-x-y}Ca_xEu_yAl_{12}O_{19.29}$, wherein $0<x<0.25$ and $0.01<y<0.20$.

2. The VUV-excited device of claim 1 wherein the europium-activated, calcium-substituted barium hexa-aluminate phosphor is coated with aluminum oxyhydroxide.

3. The VUV-excited device of claim 1 wherein the device generates a vacuum ultraviolet light having a wavelength of 147 nm to 173 nm.

4. The VUV-excited device of claim 1 wherein the discharge chamber contains xenon or a mixture of xenon and helium.

5. The VUV-excited device of claim 1 wherein the phosphor coating additionally contains a phosphor selected from the group consisting of europium-activated barium magnesium aluminate, europium-activated barium magnesium aluminate coated with aluminum oxyhydroxide, and $(Gd,La)PO_4:Tm,Li$.

6. The VUV-excited device of claim 1 wherein the phosphor coating additionally contains a $(Gd,La)PO_4:Tm,Li$ phosphor and a ratio of the europium-activated, calcium-substituted barium hexa-aluminate phosphor to the $(Gd,La)PO_4:Tm,Li$ is in the range from 2:1 to 20:1 by weight.

7. A VUV-excited device including a discharge chamber with a phosphor coating, the discharge chamber containing a rare gas or rare gas mixture, the phosphor coating being applied to an inner surface of the discharge chamber, the device when operated generating a discharge which emits vacuum ultraviolet radiation as a primary source of excitation, the phosphor coating containing a europium-activated, calcium-substituted barium hexa-aluminate phosphor having a composition which is represented by $Ba_{1.29-x-y}Ca_xEu_yAl_{12}O_{19.29}$, wherein $0<x<0.25$ and $0.01<y<0.20$ wherein the discharge chamber contains xenon or a mixture of xenon and helium, and wherein the device generates a vacuum ultraviolet light having a wavelength of 147 nm to 173 nm.

8. The VUV-excited device of claim 7 wherein the phosphor coating additionally contains a phosphor selected from the group consisting of europium-activated barium magnesium aluminate, europium-activated barium magnesium aluminate coated with aluminum oxyhydroxide, and $(Gd,La)PO_4:Tm,Li$.

9. The VUV-excited device of claim 7 wherein the phosphor coating additionally contains a $(Gd,La)PO_4:Tm,Li$ phosphor and a ratio of the europium-activated, calcium-substituted barium hexa-aluminate phosphor to the $(Gd,La)PO_4:Tm,Li$ is in the range from 2:1 to 20:1 by weight.

10. The VUV-excited device of claim 7 wherein the europium-activated, calcium-substituted barium hexa-aluminate phosphor is coated with aluminum oxyhydroxide.

11. A method of generating blue light comprising exciting a blue-emitting phosphor with vacuum ultraviolet radiation, the blue-emitting phosphor comprising an europium-activated, calcium-substituted barium hexa-aluminate phosphor wherein the europium-activated, calcium-substituted barium hexa-aluminate phosphor has a composition which is represented by $Ba_{1.29-x-y}Ca_xEu_yAl_{12}O_{19.29}$, wherein $0<x<0.25$ and $0.01<y<0.20$.

12. The method of claim 11 wherein the device generates a vacuum ultraviolet light having a wavelength of 147 nm to 173 nm.

13. The method of claim 11 wherein the phosphor coating additionally contains a phosphor selected from the group consisting of europium-activated barium magnesium aluminate, europium-activated barium magnesium aluminate coated with aluminum oxyhydroxide, and $(Gd,La)PO_4$:Tm, Li.

14. The method of claim 11 wherein the phosphor coating additionally contains a $(Gd,La)PO_4$:Tm,Li phosphor and a ratio of the europium-activated, calcium-substituted barium hexa-aluminate phosphor to the $(Gd,La)PO_4$:Tm,Li is in the range from 2:1 to 20:1 by weight.

15. The method of claim 11 wherein the europium-activated, calcium-substituted barium hexa-aluminate phosphor is coated with aluminum oxyhydroxide.

* * * * *